(12) United States Patent
Chung

(10) Patent No.: US 10,994,789 B2
(45) Date of Patent: May 4, 2021

(54) REAR CROSS MEMBER STRUCTURE FOR VEHICLE

(71) Applicant: HYUNDAI MOBIS CO., LTD., Seoul (KR)

(72) Inventor: Hong Rae Chung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 112 days.

(21) Appl. No.: 16/592,524

(22) Filed: Oct. 3, 2019

(65) Prior Publication Data

US 2020/0108875 A1    Apr. 9, 2020

(30) Foreign Application Priority Data

Oct. 5, 2018  (KR) .................. 10-2018-0118782

(51) Int. Cl.
*B62D 27/04*    (2006.01)
*B62D 21/03*    (2006.01)
*B62D 21/15*    (2006.01)

(52) U.S. Cl.
CPC ............. *B62D 27/04* (2013.01); *B62D 21/03* (2013.01); *B62D 21/155* (2013.01)

(58) Field of Classification Search
CPC ....... B62D 27/04; B62D 21/03; B62D 21/155
See application file for complete search history.

(56) References Cited

U.S. PATENT DOCUMENTS

| 2013/0147134 A1* | 6/2013 | Lee ...................... B60G 17/015 |
| | | 280/5.52 |
| 2014/0300067 A1* | 10/2014 | Yoo ...................... B60G 17/016 |
| | | 280/5.514 |

\* cited by examiner

*Primary Examiner* — Lori L Lyjak
(74) *Attorney, Agent, or Firm* — Morgan, Lewis & Bockius LLP

(57) ABSTRACT

The rear cross member structure includes a cam bolt seating unit formed in a rear cross member and having a cam bolt which fixes a lower arm and is seated in the cam bolt seating unit, a cam bolt insertion hole unit formed in the cam bolt seating unit and having the cam bolt inserted into the cam bolt insertion hole unit, and a cam bolt guide unit protruding from the cam bolt seating unit and configured to guide a rotation of the cam bolt by being brought into contact with sides of the cam bolt.

10 Claims, 7 Drawing Sheets

REAR CROSS MEMBER STRUCTURE FOR VEHICLE

CROSS-REFERENCE TO RELATED APPLICATION

The present application claims priority under 35 U.S.C. § 119(a) to Korean Patent Application No. 10-2018-0118782, filed on Oct. 5, 2018 in the Korean Intellectual Property Office, which is incorporated herein by reference in its entirety.

BACKGROUND

1. Technical Field

Exemplary embodiments of the present disclosure relate to a rear cross member structure for a vehicle, and more particularly, to a rear cross member structure for a vehicle, which can solve prime cost and excessive load problems and improve durability by implementing a cam guide shape in a rear cross member, in which a cam bolt is positioned, by forming.

2. Related Art

In general, in the case of a passenger car, a cross member is positioned in a portion on which the load of a suspension is concentrated, and is positioned at the front and rear wheel locations of a chassis in the breadth direction of the car in order to support many parts of the suspension and to bear a lateral load delivered to the chassis. The cross member is divided into a front cross member and a rear cross member depending on its installation location.

The front cross member or the rear cross member has an upper part coupled to the chassis and a lower part coupled to the suspension, and functions to prevent torsion or bending in the front and rear or left and right direction of the car.

An assist arm and a lower arm are coupled to the rear cross member by eccentric cam bolts so that a toe angle and a camber angle can be adjusted in order to secure straightness and driving improvements of a vehicle wheel. The toe angle and the camber angle can be adjusted by rotating the cam bolt guided by a cam guide.

In a conventional technology, as shown in FIG. 1, a separate cam guide 30 that guides the rotation of a cam bolt is positioned around the bolt hole 20 of a rear member 10 of a rear cross member 1.

There are problems in that a manufacturing cost rises and weight is excessive because the separate cam guide 30 is installed. Furthermore, there is a problem in that durability is reduced because the separate cam guide 30 is formed by welding.

SUMMARY

Various embodiments are directed to the provision of a rear cross member structure for a vehicle, which can solve prime cost and excessive load problems and improve durability by implementing a cam guide shape in a rear cross member, in which a cam bolt is positioned, by forming.

In an embodiment, a rear cross member structure for a vehicle includes a cam bolt seating unit formed in a rear cross member and having a cam bolt which fixes a lower arm and is seated in the cam bolt seating unit, a cam bolt insertion hole unit formed in the cam bolt seating unit and having the cam bolt inserted into the cam bolt insertion hole unit, and a cam bolt guide unit protruding from the cam bolt seating unit and configured to guide a rotation of the cam bolt by being brought into contact with the sides of the cam bolt.

In an embodiment, the cam bolt guide unit is inclined from the cam bolt seating unit at a given angle.

In an embodiment, the cam bolt guide unit is inclined from the cam bolt seating unit at 90 degrees to 130 degrees.

In an embodiment, the cam bolt guide unit is integrated with the cam bolt seating unit by a forming process.

In an embodiment, the cam bolt seating unit has an oval having a long length in a vertical direction.

In an embodiment, the cam bolt insertion hole unit is formed in the cam bolt seating unit in an oval having a long length in a horizontal direction.

In an embodiment, the cam bolt seating unit is depressed from a surface of the rear cross member at a given depth.

In an embodiment, the cam bolt guide unit has a closed ring shape surrounding the circumference of the cam bolt insertion hole unit.

In an embodiment, a pair of contact region parts brought into contact with the sides of the cam bolt is formed in a pair of regions which are opposite locations of the closed ring shape of the cam bolt guide unit.

In an embodiment, a pair of extension guide parts protruding higher than the cam bolt guide unit to extend cross sections of the pair of contact region parts is formed in the pair of regions in which the pair of contact region parts is formed.

DETAILED DESCRIPTION

Figure 1:
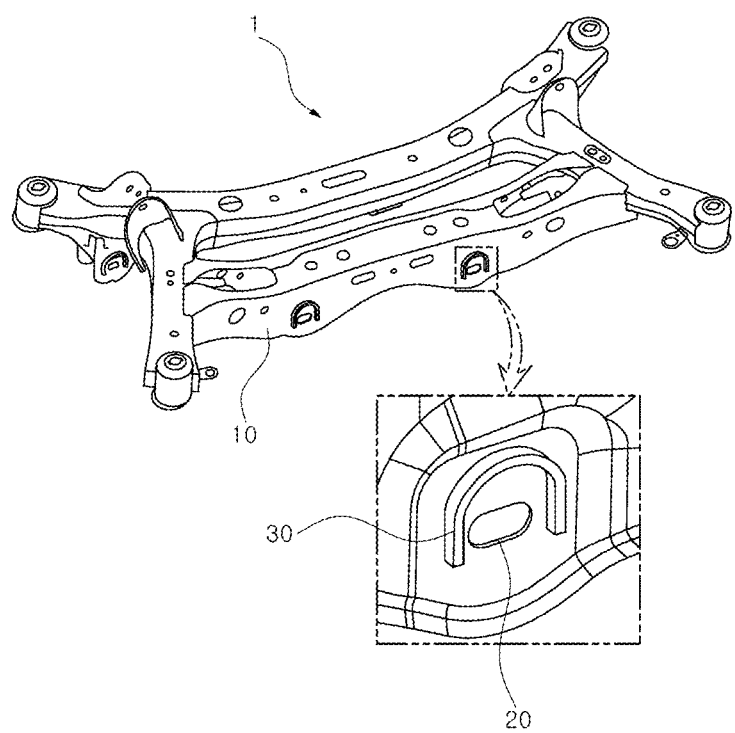
FIG. 1 illustrates a conventional rear cross member for a vehicle.

Hereinafter, a rear cross member structure for a vehicle according to an embodiment of the present disclosure will be described in detail with reference to the accompanying drawings. In such a process, the thickness of lines or the size of elements shown in the drawings may have been exaggerated for the clarity of a description and for convenience' sake. Furthermore, terms to be described hereunder have been defined by taking into consideration functions in the present disclosure, and may be different depending on a user, an operator's intention or practice. Accordingly, each term should be defined based on contents over the entire specification.

Figure 2:
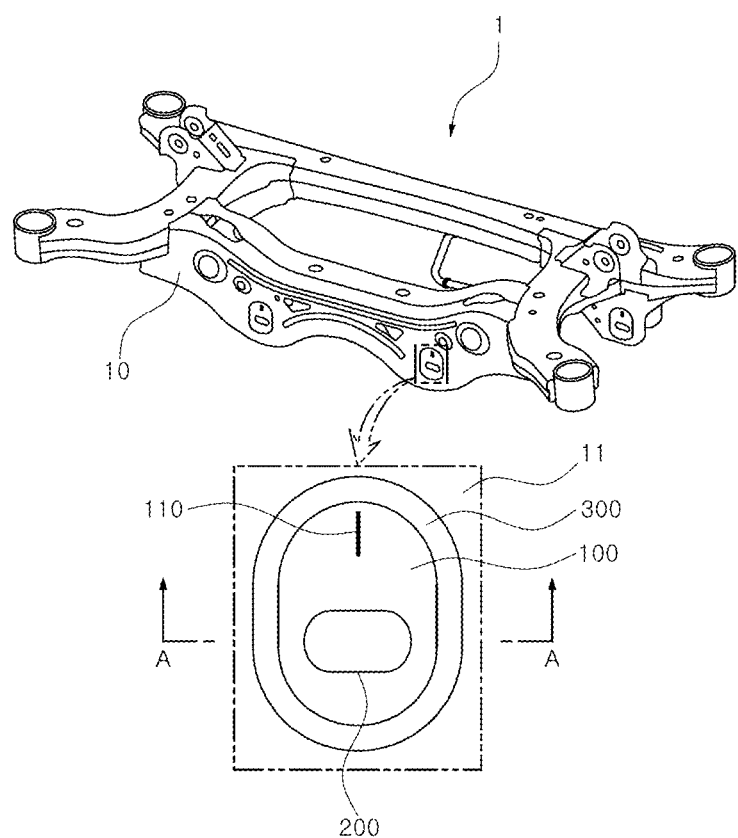
FIG. 2 illustrates a rear cross member structure for a vehicle according to an embodiment of the present disclosure.
Figure 3:
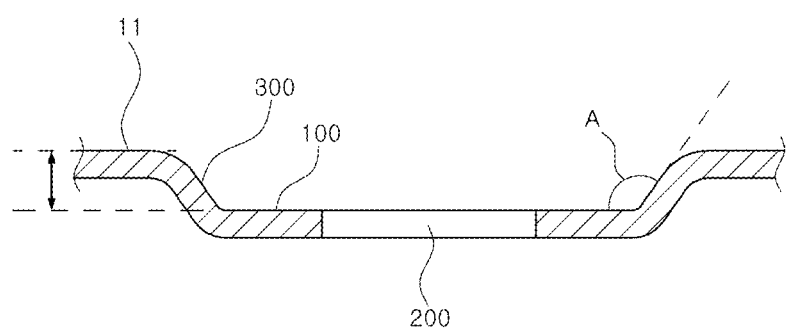
FIG. 3 illustrates a cross section taken along line A-A of FIG. 2.
Figure 4:
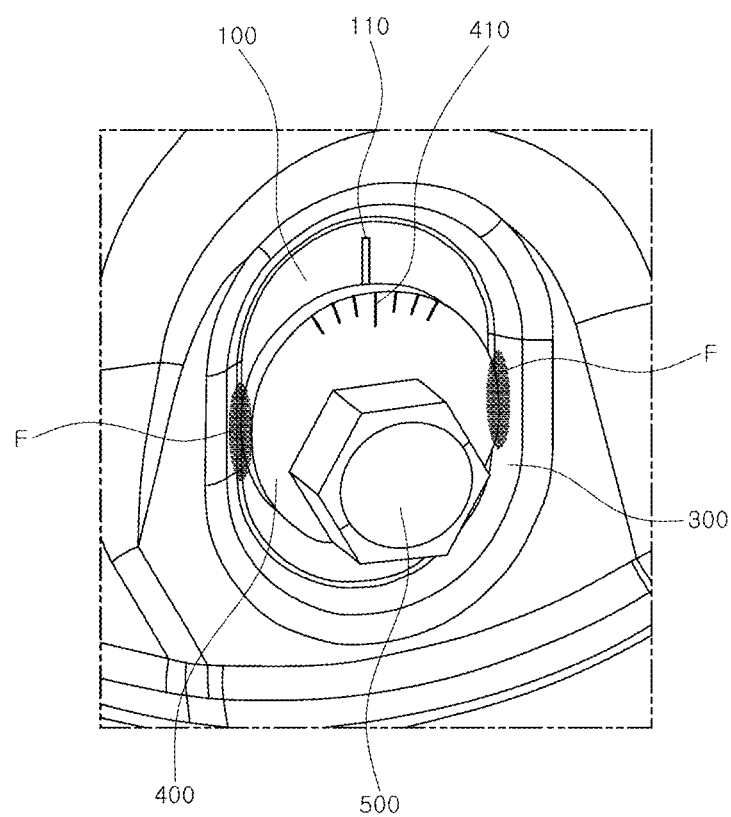
FIG. 4 illustrates the contact structure of a cam bolt guide unit and a cam bolt in the rear cross member structure for a vehicle according to an embodiment of the present disclosure.
Figure 5:
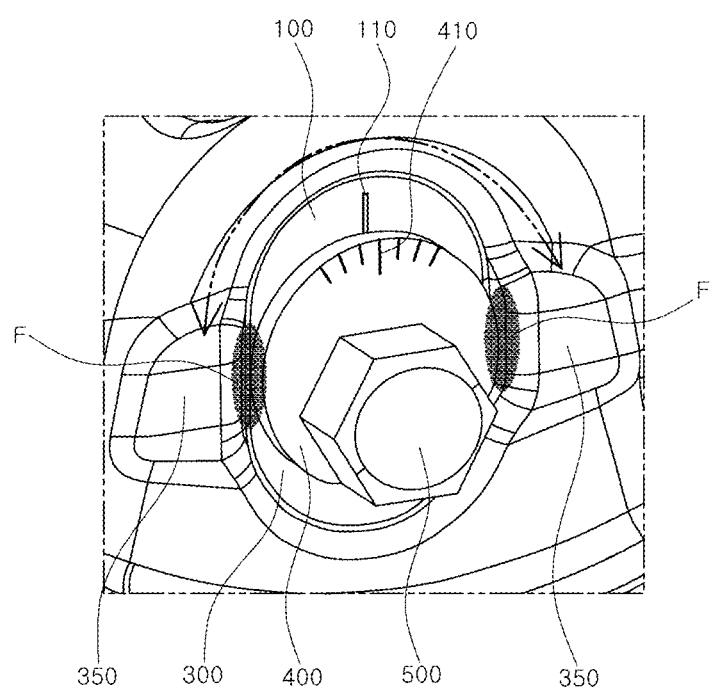
FIG. 5 illustrates the contact structure of a cam bolt guide unit, an extension guide part and a cam bolt in the rear cross member structure for a vehicle according to an embodiment of the present disclosure.
Figure 6:
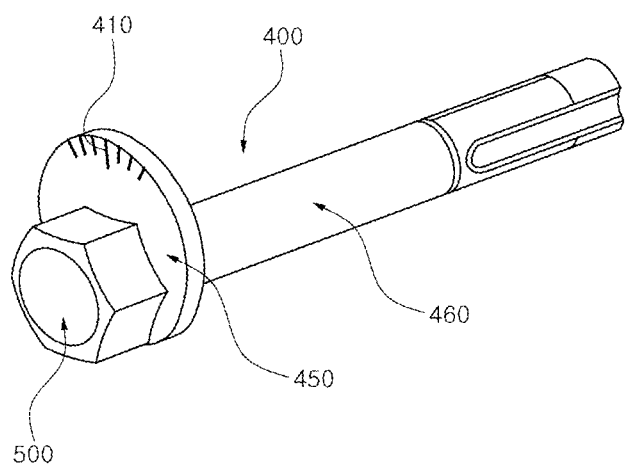
FIG. 6 illustrates a cam bolt of the rear cross member structure for a vehicle according to an embodiment of the present disclosure.
Figure 7:
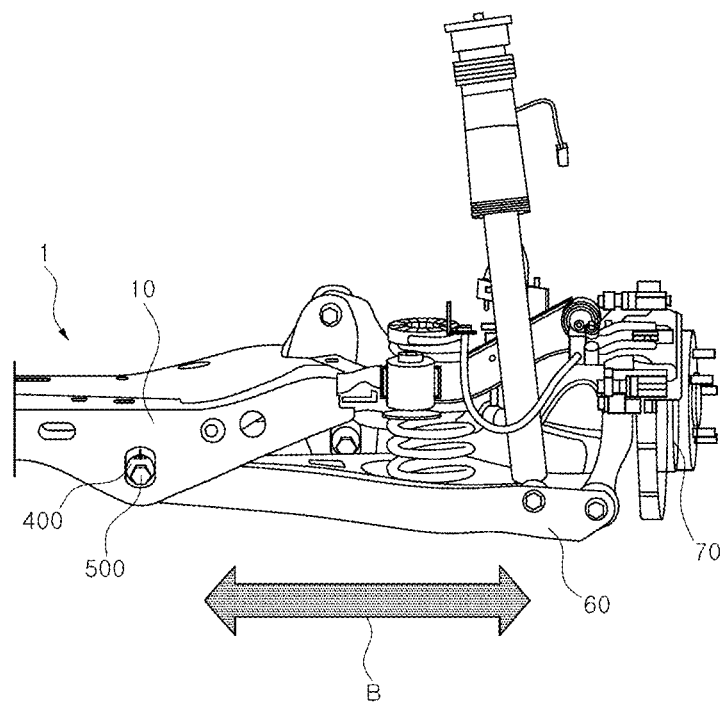
FIG. 7 illustrates a structure in which the rear cross member structure for a vehicle according to an embodiment of the present disclosure and a lower arm are coupled.

FIG. 2 illustrates a rear cross member structure for a vehicle according to an embodiment of the present disclosure. FIG. 3 illustrates a cross section taken along line A-A of FIG. 2. FIG. 4 illustrates the contact structure of a cam bolt guide unit and a cam bolt in the rear cross member structure for a vehicle according to an embodiment of the present disclosure. FIG. 5 illustrates the contact structure of a cam bolt guide unit, an extension guide part and a cam bolt in the rear cross member structure for a vehicle according to an embodiment of the present disclosure. FIG. 6 illustrates a cam bolt of the rear cross member structure for a vehicle according to an embodiment of the present disclosure. FIG. 7 illustrates a structure in which the rear cross member structure for a vehicle according to an embodiment of the present disclosure and a lower arm are coupled.

Referring to FIGS. 2 to 7, the rear cross member structure for a vehicle according to an embodiment of the present disclosure includes a cam bolt seating unit 100 formed in a rear cross member 1 and having a cam bolt 400 which fixes a lower arm 60 and is seated in the cam bolt seating unit 100, a cam bolt insertion hole unit 200 formed in the cam bolt seating unit 100 and having the cam bolt 400 inserted into the cam bolt insertion hole unit 200, a cam bolt guide unit 300 protruding from the cam bolt seating unit 100 and configured to guide the rotation of the cam bolt 400 by being brought into contact with the sides of the cam bolt 400, and the cam bolt 400 rotating by being brought into contact with the cam bolt guide unit 300 and configured to adjust a toe angle and a camber angle by changing the fixing location of the lower arm based on its rotation angle.

The rear cross member 1 is coupled to a chassis and a suspension, and functions to prevent torsion or bending in the front and rear direction or left and right direction of a vehicle.

The rear cross members 1 are positioned to face each other. Each of the rear cross members 1 includes a pair of side members, each including a side front and a side rear, a rear member 10 having one end connected to the side rear of any one and having the other end connected to the side rear of the other, and a front member having one end connected to the side front of any one and having the other end connected to the side front of the other.

An assist arm (not shown) and the lower arm 60 are connected to the rear member 10 of the rear cross member 1 by the eccentric cam bolt 400 so that the toe angle and camber angle of a wheel bearing assembly can be adjusted in order to secure straightness and driving improvements of a vehicle wheel. The toe angle and the camber angle can be adjusted by rotating the cam bolt 400 guided by the cam bolt guide unit 300.

The cam bolt seating unit 100 has an approximately oval having a long length in a vertical direction, and is depressed from a rear surface 11 of the rear member 10 at a given depth. A reference line 110 serving as a reference when the cam bolt 400 is rotated is formed in the cam bolt seating unit 100.

The cam bolt insertion hole unit 200 is formed in the cam bolt seating unit 100 in an approximately oval having a long length in a horizontal direction. The eccentric shaft (not shown) of the cam bolt 400 is inserted into the cam bolt insertion hole unit 200. The eccentric shaft performs a left and right reciprocating motion within the cam bolt insertion hole unit 200 as the cam bolt 400 rotates.

Accordingly, as shown in FIG. 7, the lower arm 60 moves in the direction of an arrow B, and thus the toe angle and camber angle of the wheel bearing assembly 70 connected to the lower arm 60 are changed.

The cam bolt guide unit 300 is integrated with the cam bolt seating unit 100 by a forming process.

Accordingly, prime cost and excessive load problems can be solved and durability can be improved because, in forming the cam bolt guide unit 300, a cam guide unit shape is implemented by forming without installing a separate guide unit using a method, such as welding, as in a conventional technology.

The cam bolt guide unit 300 is formed in a shape protruding in an inclined direction with respect to the cam bolt seating unit 100, and is formed in a shape depressed in an inclined direction toward the cam bolt seating unit 100 with respect to the rear surface 11 of the rear member 10.

That is, as shown in FIG. 3, the cam bolt guide unit 300 is inclined at a given angle A for the cam bolt seating unit 100.

The angle A at which the cam bolt guide unit 300 is inclined with respect to the cam bolt seating unit 100 may be 90 degrees to 130 degrees. In order to secure a contact area with the cam bolt 400, the angle needs to be at least 90 degrees. If the angle exceeds 130 degrees, it is difficult to secure a valid contact area.

The cam bolt guide unit 300 has a closed ring shape to surround the circumference of the cam bolt insertion hole unit 200, and has an approximately oval having a long length in the vertical direction like the shape of the cam bolt seating unit 100.

As shown in FIG. 4, a pair of contact region parts F brought into contact with the sides of the cam bolt 400 is formed in a pair of regions which are opposite locations of the closed ring shape of the cam bolt guide unit 300.

When the cam bolt 400 is rotated, the sides of the cam bolt 400 are guided while being brought into contact with the contact region parts F.

Furthermore, as shown in FIG. 5, a pair of extension guide parts 350 protruding higher than the cam bolt guide unit 300 to extend the cross sections of the pair of contact region parts F may be further formed in the pair of regions in which the pair of contact region parts F is formed.

When the cam bolt 400 is rotated, the sides of the cam bolt 400 are more precisely guided while being brought into contact with the contact region parts F having their cross sections extended.

The cam bolt 400 includes a cam bolt head 450 and an eccentric shaft 460. A scale mark 410 is formed in the cam bolt head 450. When the cam bolt head 450 is rotated, a rotation angle of the cam bolt head 450 may be calculated by comparing the scale mark 410 with the reference line 110 formed in the cam bolt seating unit 100.

In order to rotate the cam bolt 400, a hexagonal head 500 is separately provided in the cam bolt head 450. The head 500 and the cam bolt head 450 may be integrated. The head 500 is positioned to become eccentric out of the center of the cam bolt head 450.

The eccentric shaft 460 of the cam bolt 400 is inserted into the cam bolt insertion hole unit 200, and is formed to become eccentric out of the center of the cam bolt head 450. The center of the eccentric shaft 460 and the center of the head 500 are disposed to coincide with each other.

If the cam bolt head 450 is rotated by manipulating the head 500 using a tool, the sides of the cam bolt head 450 are rotated while being guided by the pair of contact region parts F formed in the cam bolt guide unit 300.

As described above, the rear cross member structure for a vehicle according to an embodiment of the present disclosure can solve prime cost and excessive load problems and improve durability by implementing the cam guide shape in the rear cross member, in which the cam bolt is positioned, by forming.

Although embodiments of the present disclosure have been disclosed for illustrative purposes, those skilled in the art will appreciate that various modifications, additions and substitutions are possible, without departing from the scope and spirit of the present disclosure as defined in the accompanying claims.

What is claimed is:

1. A rear cross member structure for a vehicle, comprising:
    a cam bolt seating unit formed in a rear cross member and having a cam bolt which fixes a lower arm and is seated in the cam bolt seating unit;
    a cam bolt insertion hole unit formed in the cam bolt seating unit and having the cam bolt inserted into the cam bolt insertion unit; and
    a cam bolt guide unit protruding from the cam bolt seating unit and configured to guide a rotation of the cam bolt by being brought into contact with sides of the cam bolt.

2. The rear cross member structure of claim 1, wherein the cam bolt guide unit is inclined from the cam bolt seating unit at a given angle.

3. The rear cross member structure of claim 2, wherein the cam bolt guide unit is inclined from the cam bolt seating unit at 90 degrees to 130 degrees.

4. The rear cross member structure of claim 2, wherein the cam bolt guide unit is integrated with the cam bolt seating unit by a forming process.

5. The rear cross member structure of claim 4, wherein the cam bolt seating unit has an oval having a long length in a vertical direction.

6. The rear cross member structure of claim 5, wherein the cam bolt insertion hole unit is formed in the cam bolt seating unit in an oval having a long length in a horizontal direction.

7. The rear cross member structure of claim 4, wherein the cam bolt seating unit is depressed from a surface of the rear cross member at a given depth.

8. The rear cross member structure of claim 4, wherein the cam bolt guide unit has a closed ring shape surrounding a circumference of the cam bolt insertion hole unit.

9. The rear cross member structure of claim 8, wherein a pair of contact region parts brought into contact with sides of the cam bolt is formed in a pair of regions which are opposite locations of the closed ring shape of the cam bolt guide unit.

10. The rear cross member structure of claim 9, wherein a pair of extension guide parts protruding higher than the cam bolt guide unit to extend cross sections of the pair of contact region parts is formed in the pair of regions in which the pair of contact region parts is formed.

* * * * *